United States Patent [19]

Schaaf et al.

[11] 4,373,591
[45] Feb. 15, 1983

[54] IMPLEMENT AND LAST MOTION HITCH LOCKING MECHANISM THEREFOR

[75] Inventors: Wayne J. Schaaf; Bennie J. Boswell, both of Kewanee, Ill.

[73] Assignee: Chromalloy American Corporation, St. Louis, Mo.

[21] Appl. No.: 252,850

[22] Filed: Apr. 10, 1981

[51] Int. Cl.³ .............................................. A01B 59/04
[52] U.S. Cl. ..................................... 172/328; 74/105; 172/501
[58] Field of Search ............. 172/327, 328, 396, 413, 172/414, 501; 280/414.5; 74/105, 469; 403/116

[56] References Cited

U.S. PATENT DOCUMENTS

| | | | |
|---|---|---|---|
| 1,446,382 | 2/1923 | Dwight | 403/116 X |
| 2,458,091 | 1/1949 | Moore | 172/396 |
| 2,580,100 | 12/1951 | Johansen et al. | 280/414.5 |
| 2,717,479 | 9/1955 | Scheidenhelm et al. | 172/328 |
| 2,797,542 | 7/1957 | Webster et al. | 172/328 |
| 2,824,505 | 2/1958 | Coviello | 172/328 X |
| 3,006,422 | 10/1961 | Mighell | 172/328 X |
| 3,063,737 | 11/1962 | Coughran | 280/414.5 |
| 3,202,225 | 8/1965 | Richardson | 172/328 |
| 3,648,780 | 3/1972 | Fueslein et al. | 172/413 X |
| 3,759,332 | 9/1973 | Robertson, Sr. | 172/413 X |
| 3,802,172 | 4/1974 | Mathews | 172/501 X |
| 3,878,901 | 4/1975 | Robertson, Sr. | 172/413 |
| 3,902,482 | 9/1975 | Taylor | 403/116 X |
| 3,912,017 | 10/1975 | Rehn | 172/328 |
| 3,912,018 | 10/1975 | Brundage et al. | 172/328 |
| 4,108,249 | 8/1978 | Anderson et al. | 172/328 |

Primary Examiner—Richard T. Stouffer
Attorney, Agent, or Firm—Haverstock, Garrett & Roberts

[57] ABSTRACT

A hitch locking mechanism for an implement or the like having a frame and transport wheels movable between lowered transport positions wherein the frame is raised for transport and raised positions wherein the frame is lowered for an operating mode, and having a hitch bar hinged to the frame, the hitch locking mechanism being interconnected between the transport wheels and the hitch bar and being operative to maintain the hitch bar in fixed relation to the frame when the transport wheels are in their lowered transport positions, and operative to enable hinged movement of the hitch bar relative to the frame when the transport wheels are in their raised positions.

16 Claims, 7 Drawing Figures

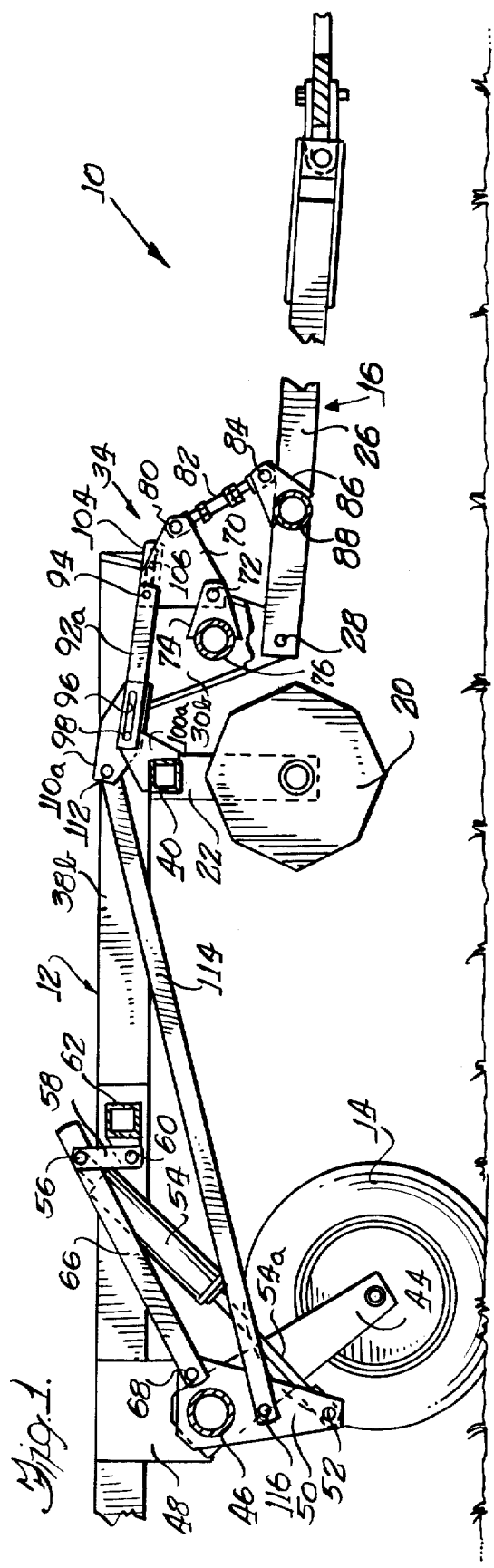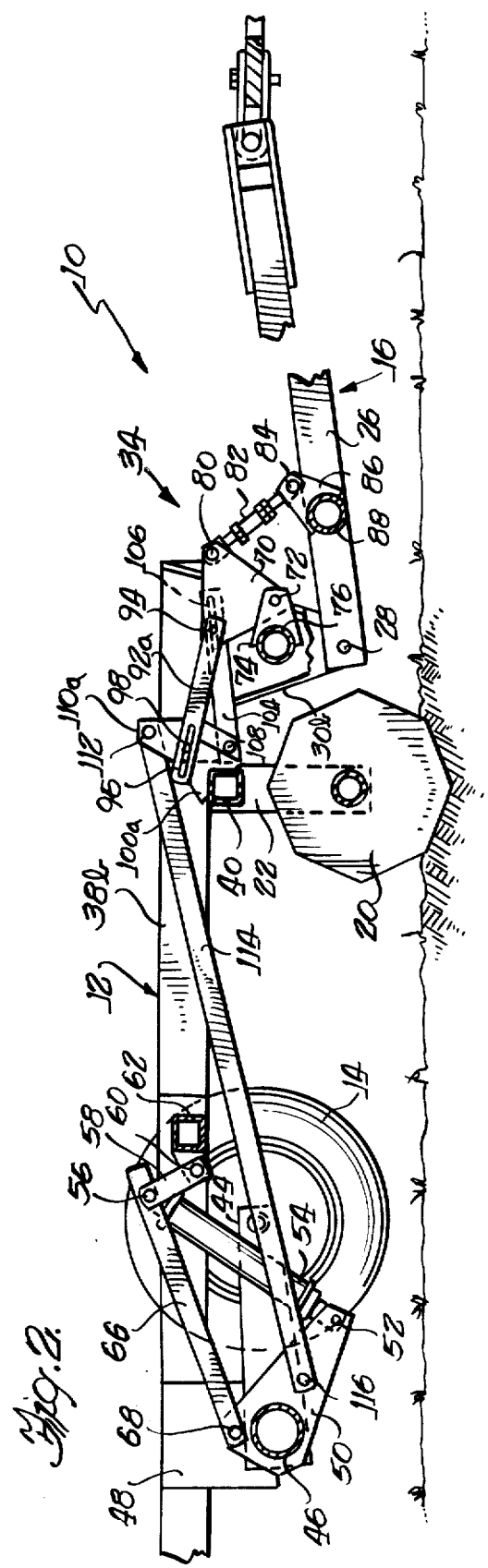

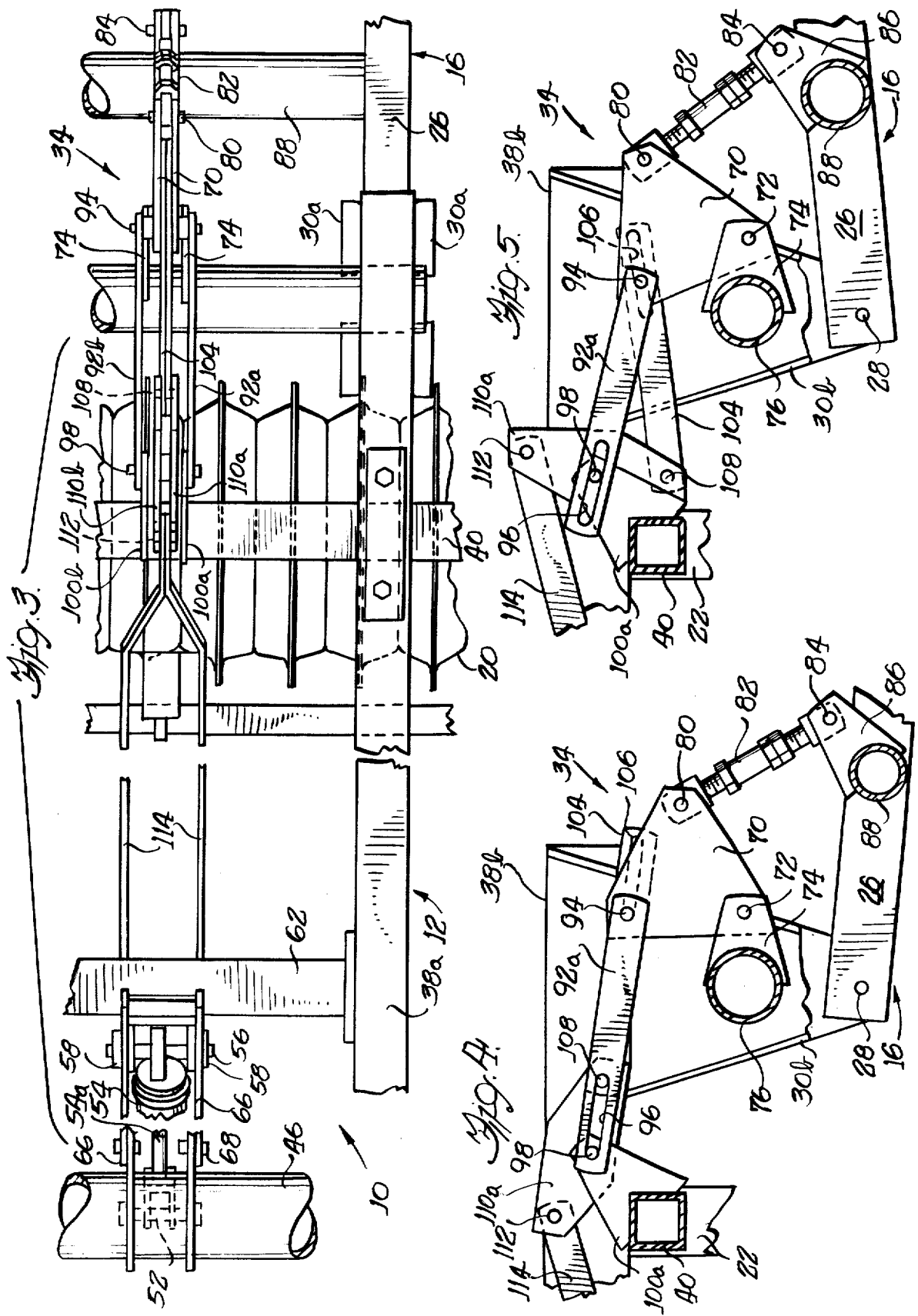

IMPLEMENT AND LAST MOTION HITCH LOCKING MECHANISM THEREFOR

HITCH LOCKING MECHANISM FOR AN IMPLEMENT

The present invention relates generally to hitch mechanisms for implements and the like, and more particularly to a novel hitch locking mechanism operative in a first mode to maintain a hitch bar in fixed relation to the implement frame and operative in a second mode to enable hinged movement of the hitch bar relative to the implement frame.

It is a common practice in hitch drawn implements and the like, and particularly in agricultural implements having a frame and transport wheels movable between lowered transport positions maintaining the frame and associated ground working tools raised for transport and raised positions wherein the frame and ground working tools are lowered for an operating mode, to provide a hitch locking mechanism which facilitates locking of the hitch bar or tongue in relatively fixed relation to the implement frame during a transport mode but which enables hinged movement of the hitch bar relative to the frame during a ground working mode. See, for example, U.S. Pat. No. 3,006,422.

In agricultural implements such as mulchers and disks and the like which carry ground working tools generally transversely of the implement and require relatively large frame structures, the transport wheels are generally positioned some distance from the forward end of the frame to which the hitch bar is hingedly connected. In order that the hitch bar operate in relation to the position of the transport wheels, a control link or the like must generally be provided which interconnects the transport wheels to a forwardly disposed mechanism operable to lock the hitch bar in response to movement of the transport wheels to predetermined transport positions. Such a control link may undergo substantial axial compressive loading when the hitch bar is in a locked position and subjected to upward reaction forces, thereby requiring that the control link be made of sufficient strength to withstand axial compressive loading without buckling or failure. It follows that the cost of such a control link which must withstand substantial compressive loading during operation is significantly greater than would be the case if the control link were not subjected to axial compressive loading.

In agricultural implements which have relatively short length frames, considered in the longitudinal direction of the implement and associated draft vehicle, the transport wheels may be mounted relatively close to the forward hitch bar so that long control links of the aforementioned type are not necessary. In shorter frame type implements, the shorter distance from the transport wheels to the hitch bar lends itself to interconnecting the hitch bar to the transport wheel rockshaft or other wheel support means through relatively short length connecting links. The known implements of this type, however, employ relatively complex arrangements for maintaining the hitch bar in fixed relation to the implement frame when in its transport position.

A general object of the present invention is to provide a novel hitch locking mechanism for an implement or the like, which hitch locking mechanism is relatively simple in construction and highly effective to maintain a hitch bar in relatively fixed relation to the implement frame during a transport mode, while facilitating hinged movement of the hitch bar relative to the frame during ground working operation of the implement.

A more particular object of the present invention is to provide a novel hitch locking mechanism for an implement or the like which employs lost motion link means interconnected between implement transport wheels and a forward hinged hitch bar and which cooperate to maintain the hitch bar in fixed relation to the frame during a first transport mode but which enable hinged movement of the hitch bar during a second operating mode.

A feature of one embodiment of the invention lies in the provision of an elongated control link interconnecting the transport wheels to a pivot link which is cooperative with lost motion links to control locking of the hitch bar, the pivot link and lost motion links being operative to prevent the control link from being subjected to significant axial compression loads during a transport mode which might damage the control link.

A feature of another embodiment of the hitch locking mechanism in accordance with the present invention lies in the provision of novel lost motion links directly interconnecting a transverse rockshaft, on which the transport wheels are mounted, to a pivot plate to which the hitch bar is connected, the lost motion links being cooperative with the pivot plate to maintain the hitch bar in fixed relation to the implement frame when the transport wheels are in lowered transport positions, but enabling hinged movement of the hitch bar relative to the frame when the transport wheels are raised as in an operating position.

Further objects and advantages of the present invention, together with the organization and manner of operation thereof will become apparent from the following detailed description of the invention when taken in conjunction with the accompanying drawings wherein like reference numerals designate like elements throughout the several views, and wherein:

FIG. 1 is a fragmentary longitudinal sectional view of an agricultural implement employing a hitch mechanism in accordance with the present invention, the implement being illustrated with its transport wheels in lowered transport position;

FIG. 2 is a longitudinal sectional view similar to FIG. 1 but illustrating the implement transport wheels in raised position as during an operating mode;

FIG. 3 is a fragmentary plan view, on an enlarged scale, of the implement illustrated in FIG. 1;

FIG. 4 is a fragmentary view, on an enlarged scale, illustrating the hitch bar locking mechanism with the hitch bar in locked or relatively fixed relation to the implement frame;

FIG. 5 is a fragmentary view similar to FIG. 4, but illustrating the hitch mechanism in a condition enabling hinged movement of the hitch bar relative to the implement frame;

Figure 6:
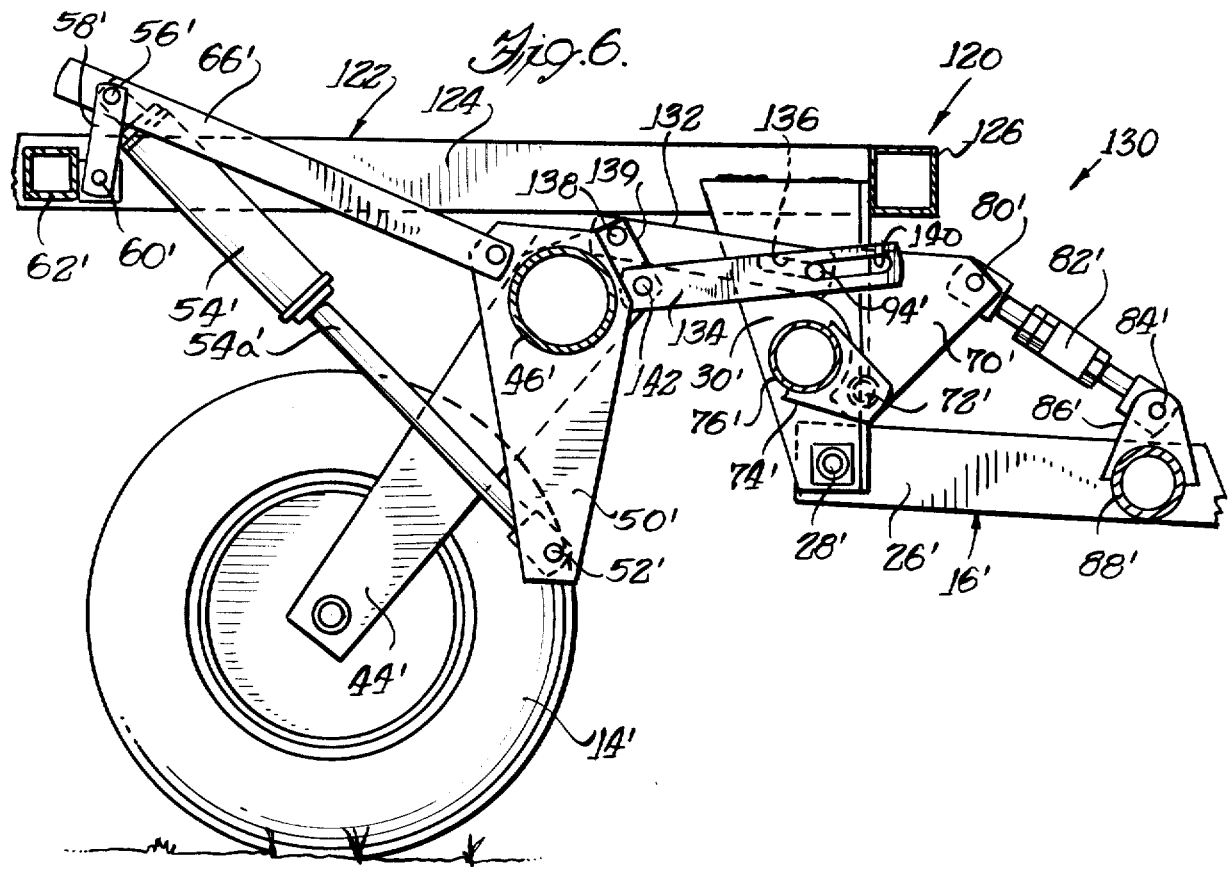
Figure 7:
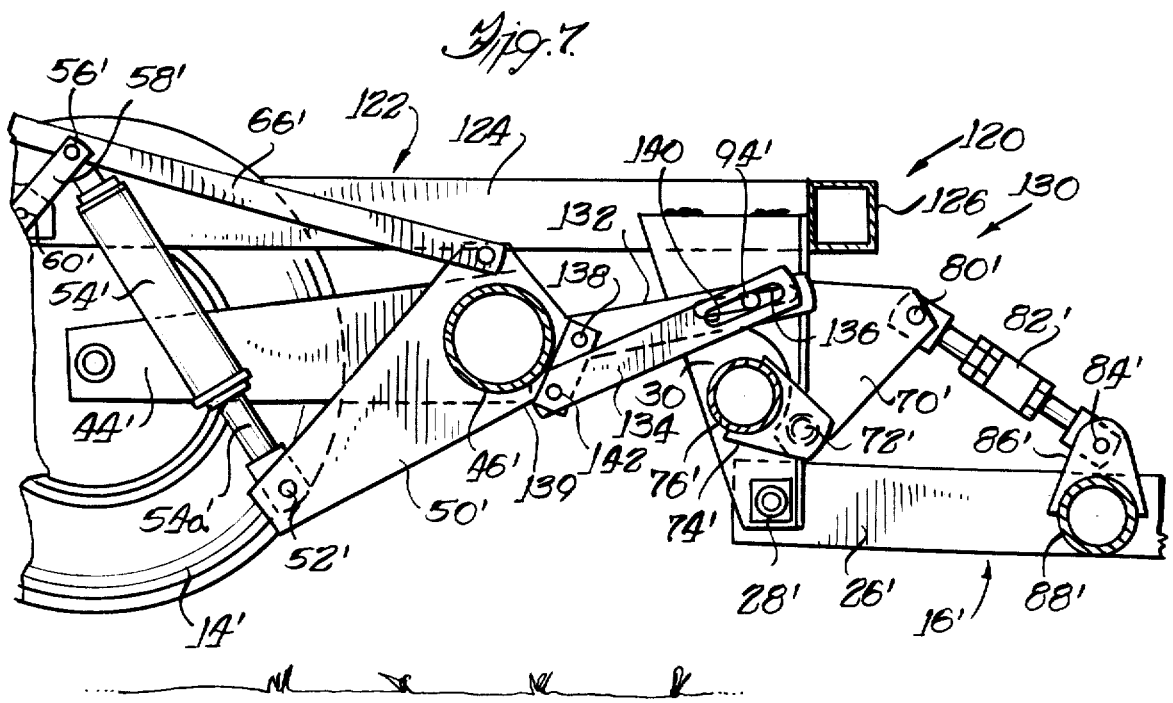

FIG. 6 is a fragmentary longitudinal sectional view of an implement employing an alternative embodiment of a hitch mechanism in accordance with the present invention, the hitch mechanism being illustrated in fixed relation to the implement frame; and FIG. 7 is a fragmentary longitudinal sectional view similar to FIG. 6 but illustrating the hitch mechanism in a condition enabling hinged movement of the hitch bar.

Referring now to the drawings, and in particular to FIGS. 1-3, a hitch locking mechanism in accordance with the present invention is illustrated, by way of example, as being embodied in an agricultural implement, indicated generally at reference numeral 10. In the illustrated embodiment, the agricultural implement 10 comprises a mulcher although, as will become more apparent hereinbelow, the hitch locking mechanism of the present invention may also be employed on other types of implements and equipment. The agricultural implement 10 includes frame means, indicated generally at 12, which may take the form of a fabricated framework of tubular frame members and which has ground engaging transport means mounted thereon in the form of a pair of laterally spaced transport wheels, one of which is indicated at 14. The frame means 12 also has hitch means, indicated generally at 16, mounted on its forward end to facilitate connection of the implement to a tractor or other draft vehicle for pulling the implement over a ground surface to be worked or along a path or highway during transport of the implement. As used herein, the longitudinal axis of the implement is defined as the axis extending generally centrally of the implement in the direction of the hitch and longitudinal axis of the associated draft vehicle when the implement is being pulled in a straight line direction.

The agricultural implement or mulcher 10 has working tools mounted thereon in the form of gangs of mulcher rollers, one of which is illustrated at 20, which are mounted on the frame means 12 through depending support brackets 22 so as to lie below the frame and extend generally transversely of the frame. It will be appreciated that the implement 10 may also carry other types of ground working tools, such as ground penetrating spring shanks or teeth, in combination with the roller gangs 20.

The transport wheels 14 are mounted on the frame means 12 in a manner to enable movement of the wheels between first lowered ground engaging transport positions wherein the frame means and associated mulcher roller gangs and ground working tools are raised to facilitate transport of the implement between fields or along a highway, and second raised positions wherein the frame means and associated mulcher roller gangs and/or other ground working tools are lowered for mulching and/or ground working operation. Very generally, the hitch means 16 includes a hitch bar or tongue 26 which, in the illustrated embodiment, comprises a generally A-shaped hitch bar hingedly connected to the frame means 12 for hinged or pivotal movement in a generally vertical plane about a transverse hinge or pivot axis 28 defined by the pivotal connection of the hitch bar to pairs of downwardly depending frame brackets 30a and 30b. The hitch bar or tongue 26 is interconnected to the transport wheels 14 through hitch lock means, indicated generally at 34, such that when the transport wheels are in their lowered ground engaging transport positions raising the frame means 14 and associated ground working tools for transport, the hitch bar 26 is maintained in fixed or locked relation to the frame means, but when the transport wheels are in their raised positions wherein the frame and associated ground working tools are lowered for ground working operation, the hitch bar may pivot about its hinge axis 29 relative to the frame means.

Turning now to a more detailed description of the invention, and with particular reference to FIGS. 1–5, the frame means 12 in the illustrated implement 10 includes a framework having a plurality of longitudinally extending laterally spaced frame members, two of which are shown at 38a and 38b, which have transverse frame members affixed thereto, one of which is shown at 40, so as to maintain the various longitudinal and transverse frame members in a fixed framework. In the illustrated embodiment, the roller gang support brackets 22 are affixed at their upper ends to the forward transverse frame member 40.

As aforementioned, the transport wheels 14 are movable between lowered transport positions and raised non-transport positions. To this end, the transport wheels 14 are each rotatably mounted on the lower end of an associated radial support arm, one of which is indicated at 44. The radial support arms are fixed on a rockshaft 46 journaled within support brackets 48 fixed to and depending from the frame means 12 so that the rockshaft extends transversely of the implement frame. To effect rotation of rockshaft 46 and a corresponding movement of the transport wheels 14, a pair of radial actuating arms 50 are fixed on the rockshaft 46, preferably proximate the midlength thereof, and are pivotally connected at 52 to the outer end of the extendable piston rod 54a of a fluid pressure operated double acting cylinder or ram 54 having its cylinder end pivotally connected through a pivot pin 56 to and between a pair of parallel connecting links 58 which, in turn, are pivotally connected at 60 to a transverse frame member 62. A pair of parallel stabilizing bars or links 66 have their rearward ends pivotally connected at 68 to the actuating arms 50 and are pivotally connected at their forward ends to the pivot pin 56. The cylinder or ram 54 has its piston and rod ends adapted for connection through fluid pressure flow lines (not shown) to a suitable source of fluid pressure, such as a hydraulic pump, and a flow pressure control valve which are preferably mounted on the draft vehicle to enable operator control of raising and lowering of the transport wheels through selective retraction and extension of the piston rod 54a as is known.

In accordance with the present invention, the hitch lock means 34 includes pivot plate means in the form of a pair of parallel matched pivot plates 70 pivotally mounted through a pivot pin 72 to and between a pair of spaced support brackets 74 fixed on a transverse tubular support 76 having its opposite ends fixed to the depending brackets 30a,b so as to extend transversely of the implement frame. The pivot plates 70 are pivotally connected through a pivot pin 80 to one end of a connecting link in the form of a turnbuckle 82 which has its opposite end pivotally connected through a pivot pin 84 to a pair of spaced brackets 86 mounted on a transverse tubular bar 88 fixed to the A-shaped hitch bar or tongue 26. The turnbuckle 82 facilitates selective adjustment of the hitch bar or tongue 26 relative to the pivot plate 70 so as to enable desired orientation of the hitch bar to the frame when the transport wheels are in lowered position.

Downward pivotal movement of the pivot plates 70 about their pivot axis 72, and thus downward pivotal movement of the hitch bar 26 about its pivot axis 28, as considered in a clockwise direction in FIGS. 1 and 2, is limited by first lost motion link means in the form of a pair of parallel spaced identical lost motion links 92a,b having their forward ends pivotally connected to the pivot plates 70 through a pivot pin 94. The rearward ends of links 92a,b have aligned longitudinally extending elongated slots 96 formed therethrough which receive a pivot pin 98 in sliding relation therethrough, the pivot pin 98 being fixed to and supported by a pair of laterally spaced brackets 100a,b mounted in upstanding relation on the transverse frame member 40. The slots 96 in the lost motion links 92a,b are of predetermined length so that the rearward ends thereof engage the pivot pin 98 and limit downward movement of the hitch arm to a predetermined transport position relative to the frame means 12 when the transport wheels are in their transport positions, while allowing upward pivotal movement of the hitch bar 26 to a position defining an upper range of movement of the hitch bar when the transport wheels are in their raised positions with the frame and ground working tools lowered for ground working operation.

To lock the hitch bar 26 in its downward position, defined as its transport position as shown in FIG. 1, when the transport wheels 14 are in their lowered transport positions, second lost motion link means in the form of a lost motion link 104 is pivotally connected to and between the pivot plates 70 through the pivot pin 94 which is received through a longitudinally extending elongated slot or opening 106 formed in the forward end of the link 104. The link 104, which may comprise a pair of side-by-side links, has its rearward end pivotally connected through a pivot pin 108 to one end of a pivot link comprised of a pair of parallel spaced pivot links 110a and 110b pivotally mounted substantially at their midlengths to and between the support brackets 100a,b on the pivot pin 98 so as to be generally coplanar with the pivot plates 70a,b. The ends of the pivot links 110a,b opposite pivot pin 108 are pivotally connected through a pivot pin 112 to the forward end of an elongated control link 114 which may take the form of a bifurcated link or arm having rearward ends pivotally connected to associated ones of the spaced radial actuating arms 50 through pivot pins 116.

The length of the control link 114 and the geometrical relation of the pivot links 110a,b and lost motion links 92a,b and 104 are such that when the transport wheels 14 are moved to their lowered transport positions, the control link 114 will draw the pivot links 110a,b in a counterclockwise direction about their pivot axis 98, as considered in FIGS. 1 and 2, and force the lost motion links 104 forwardly such that the rearward ends of the slots 106 engage pivot pin 94 and rotate the pivot plates 70 forwardly about the pivot axis 72. This forces the hitch bar 26 to its downward transport position as determined by the preselected adjustment of the turbuckle 82. The length of the slots 96 in the lost motion links 92a,b is such that the rearward ends of the slots 96 engage the pivot pin 98 when the pivot plates 70 are rotated forwardly a predetermined extent. In this position, the longitudinal axes of the lost motion links 92a,b and 104 are coplanar with and perpendicular to the axes of the pivot pins 94, 98 and 108 so as to lock the pivot plates 70 and hitch bar 26 in fixed relation to the frame means 12, as shown in FIGS. 1 and 4.

One feature of the hitch lock means 34 is that with the hitch bar 26 locked in its lowered transport position as aforedescribed so that the axes of the pivot pins 94, 98 and 108 are coplanar with the longitudinal axes of the links 92a,b and 104, any upward reaction force acting on the hitch bar is transfered as a force vector through the pivot plates 70, pivot pin 94, lost motion links 104, pivot pin 108 and pivot links 110a,b to the pivot pin 98 which is fixed to the implement frame, as best seen in FIG. 4. Because the pivot pins 94, 108 and 98 are coplanar, no significant rotational moment is created on the pivot links 110a,b which would establish an axial compressive force on the control link 114 through the pivot pin 112. This prevents possible axial buckling of the control link 114 and enables use of a more economical control link than would be required if the control link were subjected to substantial axial compressive loads during operation.

When the transport wheels 14 are raised through retraction of the cylinder piston rod 54a, control link 114 rotates the pivot links 110a,b in a clockwise direction about the pivot pin 98, as viewed in FIGS. 2 and 5, so that the lost motion links 104 are drawn to positions wherein the pivot pin 94 is approximately midlength of the slots 106. This allows the hitch bar to pivot upwardly with the pivot pin 98 riding freely within the slots 96 in the lost motion links 92a,b during the normal range of movement of the hitch bar in ground working operation of the implement. It will be appreciated that the lengths of slots 96 and 106 in the lost motion links 92a,b and 104, respectively, determine the upper pivotal limit of the hitch bar 26.

FIGS. 6 and 7 illustrate an alternative embodiment of an agricultural implement, indicated generally at 120, employing hitch lock means in accordance with the present invention. The implement 120 may take the form of a pulverizer having relatively short length frame means 122, considered in the longitudinal direction of the implement. The shorter length frame means 122 includes a plurality of longitudinal frame members, one of which is indicated at 124, connected to transverse frame members, one of which is indicated at 126, so as to form a rigid framework. Wheel means in the form of a pair of laterally spaced transport wheels, one of which is indicated at 14', are rotatable on the lower ends of radial support arms 44' fixed on a rotatable transverse rockshaft 46' in similar fashion to mounting of the wheels 14 on the implement 10. Similarly, a pair of closely spaced radial actuating arms 50' are fixed on the rockshaft 46' and are connected to the piston rod 54a' of a fluid pressure operated cylinder or ram 54' to enable operator control of raising and lowering of the transport wheels to lower and raise the frame means 122. Ground working tools, not shown, such as a transverse row of pulverizer rollers may be mounted on the frame means so as to be raised above ground level when the transport wheels 14' are lowered for transport, and lowered for cutting or pulverizing residue on the ground when the transport wheels are raised.

Hitch means 16' in the form of an A-shaped hitch bar or tongue 26' is pivotally mounted on the forward end of the frame means 122 through depending frame brackets 30' for hinged movement about a hinge or pivot axis 28' relative to the frame means. Hitch lock means, indicated generally at 130, interconnect the hitch bar 26 to the transport wheels 14' so as to lock the hitch bar in fixed relation to the frame means 122 when the transport wheels 14 are in lowered transport positions, while enabling pivotal or hinged movement of the hitch bar about its pivot axis 28' when the transport wheels are raised so as to lower the frame and associated ground working tools for ground working or similar operation.

The hitch lock means 130 is generally similar to the aforedescribed hitch lock means 34 on the implement 10 in that it includes a pair of closely spaced pivot plates 70' which are pivotally mounted through a pivot pin 72' to and between a pair of support brackets 74' mounted on a transverse support member 76' which is fixed at its opposite ends to and between the frame brackets 30'. The pivot plates 70' are similarly connected to the hitch bar 26' through a turnbuckle 82' pivotally connected at its opposite ends through a pivot pin 80′ to the pivot plates and through a pivot pin 84′ to connecting brackets 86′ fixed on a support member 88′ of the A-shaped hitch bar.

It will be noted that with the shorter length frame means 122 employed in the implement 120 of FIGS. 6 and 7, the rockshaft 46′ is mounted on the frame means relatively close to the forward hitch bar 26′. Because of this, the hitch lock means 130 does not include an elongated control link similar to the control link 114 employed in the hitch lock means 34. Rather, the pivot plate 70′ is connected to the rockshaft actuating arms 50′ through first and second lost motion link means in the form of a first pair of lost motion links, only one of which can be seen at 132, and a second pair of lost motion links, only one of which can be seen at 134. The lost motion links 132 have longitudinally extending elongated slots 136 formed in their forward ends which are pivotally connected to and form a lost motion connection with the pivot plates 70′ through a pivot pin 94′. The rearward ends of links 132 are pivotally connected through a pivot pin 138 to a radial bracket 139 fixed on the rockshaft 46′. The lost motion links 132 limit the extent of downward pivotal movement of the hitch bar 26′ relative to the frame means 122 when the transport wheels 14 are in their lowered transport positions.

The lost motion links 134 have longitudinally extending elongated slots 140 formed in their forward ends which are pivotally connected to and form a lost motion connection with the pivot plates 70′ through pivot pin 94′. The rearward ends of the links 134 are pivotally connected to the bracket 139 on the rockshaft 46′ through a pivot pin 142. The elongated slots 140 in the lost motion links 134 and elongated slots 136 in lost motion links 132 are such that the rearward ends of slots 140 engage the pivot pin 94′ simultaneously with pin 94′ being disposed at the forward ends of slots 136 when the transport wheels 14′ are in their lowered transport positions. As shown in FIG. 6, the configuration of the links 132 and 134 and their pivotal connections are such that a rigid triangular linkage arrangement is established which locks hitch bar 26′ in its lowered position when the transport wheels are in their lowered transport positions.

When the transport wheels 14′ are raised to lower the frame means 122 and associated ground working tools, the lost motion links 132 and 134 are moved by rotation of the rockshaft 46′ to positions wherein the pivot pin 94′ is disposed substantially midlength of the slots 136 and 140 so as to enable pivotal movement of the hitch bar 26′ about its hinged axis 28′ relative to frame means 122.

Having thus described preferred embodiments of the present invention, it will be appreciated that the hitch lock means 34 and 130 both provide relatively simple and economical yet highly effective arrangements for locking a hitch bar in fixed relation to an implement frame in direct response to movement of transport wheels to lowered transport positions, but which enable pivotal or hinged movement of the hitch bar relative to the implement frame when the transport wheels are in raised positions effecting ground engagement of ground working tools carried by the implement frame. The latter mode of operation enables the ground working tools to more readily follow the ground contour.

While preferred embodiments of the invention have been illustrated and described, it will be understood that changes and modifications may be made therein without departing from the invention in its broader aspects. For example, the lost motion links might be reversed end-for-end from the illustrated positions if the selected implement configuration allows free movement of the links without interference with other components. Similarly, while the various lost motion links 92a,b, 104, 132 and 134, the pivot plates 70 and 70′, and the pivot links 110a,b have been described as comprising pairs of links and plates, these elements could equally be provided as single members without detracting from their functional features.

Various features of the invention are defined in the following claims.

What is claimed is:

1. In an implement having a frame, a hitch bar pivotally connected to said frame for hinged movement relative to said frame, a rockshaft mounted on said frame for rotation about its longitudinal axis, and wheel means mounted on said rockshaft for movement between a lowered transport position wherein said frame is raised for transport and a raised position wherein said frame is lowered for an operating mode, the combination therewith comprising hitch lock means operatively associated with said wheel means and said hitch bar and adapted to maintain said hitch bar in fixed relation to said frame when said wheel means is in its said lowered position, said hitch lock means being adapted to enable hinged movement of said hitch bar relative to said frame when said wheel means is in its said raised position, said hitch lock means including first lost motion link means operatively associated with said hitch bar and adapted to limit downward hinged movement of said hitch bar to a first predetermined downward position when said wheel means is in its said lowered position while enabling upward hinged movement of said hitch bar to a second predetermined position when said wheel means is in its said raised position, and second lost motion link means interconnected between said wheel means and said hitch bar and adapted to prevent upward hinged movement of said hitch bar from said first predetermined position when said wheel means is in its said lowered position so as to lock said hitch bar in fixed relation to said frame, said first and second lost motion link means being cooperative in response to movement of said wheel means to its said raised position to enable upward and downward hinged movement of said hitch bar relative to said frame between its said first and second predetermined positions.

2. The combination as defined in claim 1 wherein said first and second lost motion link means are pivotally connected to said rockshaft so as to be directly responsive to movement thereof when said wheel means is moved between its said raised and lowered positions.

3. The combination as defined in claim 1 or 2 including a pivot plate pivotally supported by said frame, and a connecting link interconnecting said pivot plate to said hitch arm, said first and second lost motion link means having operative connection to said pivot plate.

4. The combination as defined in claim 3 wherein said first and second lost motion link means are each connected at a first end to said pivot plate through a lost motion connection.

5. The combination as defined in claim 4 wherein said first and second lost motion link means have their ends opposite said first ends pivotally connected to said rockshaft.

6. The combination as defined in claim 3 wherein said connecting link comprises an adjustable length link enabling selective adjustment of the orientation of said hitch bar relative to said frame.

7. The combination as defined in claim 1 wherein said first and second lost motion link means are pivotally connected to said rockshaft, and including a pivot plate pivotally supported by said frame, and a connecting link interconnecting said pivot plate to said hitch bar, said first and second lost motion link means each providing lost motion connection between said rockshaft and said pivot plate and being operative to prevent pivotal movement of said pivot plate about its pivot axis and thereby lock said hitch bar in fixed relation to said frame when said wheel means is in its said lowered position but enabling hinged movement of said pivot plate and hitch bar when said wheel means is in its said raised position.

8. The combination as defined in claim 1 including a pivot link pivotally mounted intermediate its length on said frame, a control link interconnecting said wheel means to one end of said pivot link, said first lost motion link means being interconnected between said frame and said hitch bar, and said second lost motion link means being interconnected between the opposite end of said pivot link and said hitch bar so that movement of said wheel means between its said raised and lowered positions is operative to effect movement of said second lost motion link means, said second lost motion link means being operative to prevent movement of said hitch bar upwardly from its said first predetermined position when said wheel means is in its said lowered position.

9. The combination as defined in claim 8 wherein said pivot link and said first and second lost motion link means cooperate so that reaction forces acting on said hitch bar in a manner to urge it upwardly about its pivot axis when said wheel means is in its said lowered position do not apply an axial compression force to said control link.

10. The combination as defined in claim 9 including a pivot plate pivotally mounted on said frame adjacent said hitch bar, and a connecting link interconnecting said pivot plate to said hitch bar in a manner to establish a predetermined relation between said pivot plate and said hitch bar during movement of said hitch bar, said first lost motion link means being interconnected between said frame and said pivot plate, said second lost motion link means being interconnected between said pivot link and said pivot plate, the pivotal connections of said first lost motion link means to said frame and said pivot plate and the pivotal connections of said second lost motion link means to said pivot link and said pivot plate all being coplanar when said wheel means is in its said lowered position so that no bending moments are transferred through said pivot link in a manner to establish an axial compressive force on said control link.

11. The combination as defined in claim 8 including an actuating arm mounted on said rockshaft in transverse relation thereto, said control link being pivotally connected at one end to said actuating arm and at its other end to said pivot link so as to be directly responsive to rotation of said rockshaft during movement of said wheel means between its said raised and lowered positions.

12. The combination as defined in claim 1 wherein said wheel means is mounted on said rockshaft so as to be rotatable therewith, and including fluid pressure operated means operatively associated with said rockshaft for effecting selective rotation therewith.

13. In an implement adapted to be drawn by a draft vehicle, said implement having a frame defining a longitudinal axis, a rockshaft mounted on said frame in transverse relation thereto for rotation about its longitudinal axis, wheel means mounted on said rockshaft for movement therewith, operating means operatively associated with said rockshaft and operative to effect movement of said wheel means between first lowered positions wherein said frame is raised for transport and second raised positions wherein said frame is lowered for an operating mode, and hitch means pivotally mounted on said frame and adapted for connection to a draft vehicle, said hitch means including a hitch bar pivotally connected to said frame for hinged movement about a hinge axis substantially transverse to the longitudinal axis of said frame; the combination therewith comprising, a pivot plate mounted on said frame for pivotal movement about a first pivot axis transverse to the longitudinal axis of said frame and spaced from said hinge axis of said hitch bar, a connecting link interconnecting said pivot plate to said hitch bar so that pivotal movement of said pivot plate effects a corresponding pivotal movement of said hitch bar, a pivot link pivotally mounted on said frame for pivotal movement about a second pivot axis transverse to the longitudinal axis of said frame and spaced from said hinge axis and said first pivot axis, a control link interconnected between said wheel means and said pivot link such that movement of said wheel means between its said raised and lowered positions effects pivotal movement of said pivot link about said second pivot axis, first lost motion link means interconnected between said frame and said pivot plate and limiting movement of said pivot plate in a direction to establish a predetermined lower position of said hitch bar, and second lost motion link means interconnecting said pivot link to said pivot plate, said pivot link and said first and second lost motion link means being cooperative to maintan said hitch bar in locked relation to said frame when said wheel means is in its said lowered position, and being operative to enable pivotal movement of said hitch bar about its said hinge axis when said wheel means is in its said raised position.

14. An implement as defined in claim 13 wherein said pivot plate, pivot link and first and second lost motion link means are cooperative to prevent any appreciable axial compressive forces acting on said control link when said wheel means is in its said lowered position.

15. An implement as defined in claim 13 wherein said control link comprises a fixed length rigid link.

16. An implement as defined in claim 13 wherein said connecting link comprises a turnbuckle enabling selective adjustment of said hitch bar relative to said pivot plate.

* * * * *